(12) United States Patent
Gorenzweig et al.

(10) Patent No.: US 12,509,934 B2
(45) Date of Patent: Dec. 30, 2025

(54) SENSOR DEVICE

(71) Applicant: Huf Hülsbeck & Fürst GmbH & Co. KG, Velbert (DE)

(72) Inventors: Igor Alexander Gorenzweig, Wuppertal (DE); Steffen Leib, Ratingen (DE); Yevgen Dementyev, Wuppertal (DE); Sven Hild, Hagen (DE); Andreas Gornik, Gevelsberg (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 172 days.

(21) Appl. No.: 17/794,529

(22) PCT Filed: Feb. 1, 2021

(86) PCT No.: PCT/EP2021/052281
§ 371 (c)(1),
(2) Date: Jul. 21, 2022

(87) PCT Pub. No.: WO2021/156189
PCT Pub. Date: Aug. 12, 2021

(65) Prior Publication Data
US 2023/0175305 A1    Jun. 8, 2023

(30) Foreign Application Priority Data

Feb. 5, 2020 (DE) .................. 10 2020 102 972.1

(51) Int. Cl.
*E05F 15/73* (2015.01)
*B60J 5/06* (2006.01)
(Continued)

(52) U.S. Cl.
CPC .............. *E05F 15/73* (2015.01); *B60J 5/06* (2013.01); *B60Q 9/00* (2013.01); *G01D 5/24* (2013.01);
(Continued)

(58) Field of Classification Search
CPC ... E05F 15/73; B60J 5/06; B60Q 9/00; G01D 5/24; H05K 1/18; H05K 2201/10098;
(Continued)

(56) References Cited

U.S. PATENT DOCUMENTS

2008/0231290 A1* 9/2008 Zhitomirsky ......... G01F 23/261
324/661
2012/0044199 A1* 2/2012 Karpin .............. G06F 3/041662
345/174

(Continued)

FOREIGN PATENT DOCUMENTS

DE    102014218085 A1 *  3/2015  .............. E05F 15/73
DE    102014222410 A1 *  5/2016  .............. E05F 15/73
(Continued)

OTHER PUBLICATIONS

Machine translation of EP-2767658-A2 (Year: 2014).*
(Continued)

*Primary Examiner* — Navid Z. Mehdizadeh
*Assistant Examiner* — Caitlin R McCleary
(74) *Attorney, Agent, or Firm* — Christian S. Hans; Bret E. Field; Bozicevic, Field & Francis LLP

(57) ABSTRACT

The invention relates to a sensor device (100) for actuating a movable part (101), in particular a sliding door, of a vehicle (1), comprising: a capacitive sensor unit (10) with a plurality of sensor elements (11) for motion detection, in particular gesture detection, of a user to trigger opening and/or closing of the movable part (101), an NFC antenna (30) for communicating with a vehicle-side security system (2) and/or a user-side mobile handheld device (4) in order to trigger unlocking and/or locking of the movable part (101), and a circuit board (20) for accommodating the capacitive sensor unit (10) and the NFC antenna (30).

26 Claims, 4 Drawing Sheets

Figure 7:
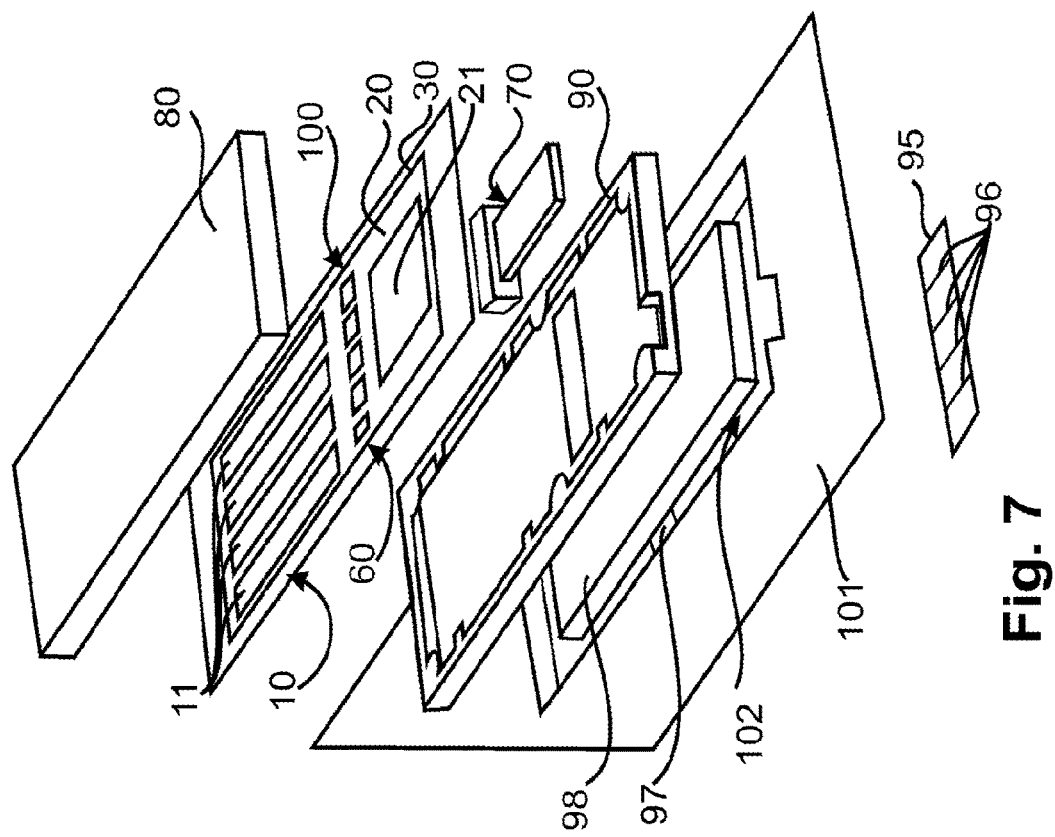

(51) Int. Cl.
*B60Q 9/00* (2006.01)
*G01D 5/24* (2006.01)
*H05K 1/18* (2006.01)

(52) U.S. Cl.
CPC ............ *H05K 1/18* (2013.01); *E05Y 2400/44* (2013.01); *E05Y 2400/852* (2013.01); *E05Y 2900/531* (2013.01); *H05K 2201/10098* (2013.01); *H05K 2201/10151* (2013.01)

(58) Field of Classification Search
CPC ...... H05K 2201/10151; E05Y 2400/44; E05Y 2400/852; E05Y 2900/531; E05Y 2400/86; H03K 2017/9604; H03K 2217/960755; H03K 17/955
See application file for complete search history.

(56) References Cited

U.S. PATENT DOCUMENTS

| | | | |
|---|---|---|---|
| 2012/0127746 A1* | 5/2012 | Lee | E05B 85/16 362/501 |
| 2012/0262414 A1* | 10/2012 | Lai | G06F 3/0443 345/174 |
| 2015/0062054 A1* | 3/2015 | Yun | G06F 3/04164 345/174 |
| 2015/0160754 A1* | 6/2015 | Wenzel | G06F 3/041662 345/174 |
| 2016/0054850 A1* | 2/2016 | Aubauer | G06F 1/16 345/174 |
| 2016/0349908 A1 | 12/2016 | Sugiura | |
| 2017/0249032 A1* | 8/2017 | Konopka | G06F 3/0418 |
| 2017/0260778 A1* | 9/2017 | Witte | G07C 9/00174 |
| 2018/0238672 A1 | 8/2018 | Miyagi et al. | |
| 2018/0367139 A1* | 12/2018 | Pribisic | H03K 17/9622 |
| 2019/0032374 A1* | 1/2019 | Linden | B60R 11/04 |
| 2019/0151879 A1* | 5/2019 | Cortland | H04B 5/77 |
| 2019/0220114 A1* | 7/2019 | Shu | G06F 3/0446 |
| 2019/0278460 A1 | 9/2019 | Scott | |
| 2019/0390488 A1 | 12/2019 | Salter et al. | |
| 2020/0262388 A1* | 8/2020 | Maddelein | B60R 25/01 |
| 2020/0282950 A1* | 9/2020 | Shimizu | B60R 25/2027 |

FOREIGN PATENT DOCUMENTS

| | | | | |
|---|---|---|---|---|
| DE | 102017103222 A1 | | 8/2017 | |
| DE | 102016219748 A1 | * | 4/2018 | |
| DE | 102018106771 A1 | | 10/2018 | |
| DE | 102018122254 B3 | | 12/2019 | |
| EP | 2767658 A2 | * | 8/2014 | ......... E05B 15/1607 |
| FR | 3065418 A1 | | 10/2018 | |
| WO | WO-2018177580 A1 | * | 10/2018 | ............... E05B 1/77 |

OTHER PUBLICATIONS

Machine translation of DE-102014222410-A1 (Year: 2016).*
Machine translation of DE-102016219748-A1 (Year: 2018).*
Machine translation of WO-2018177580-A1 (Year: 2018).*
Machine translation of DE-102014218085-A1 (Year: 2015).*
Zeiss et al., A Gesture-Based Door Control Using Capacitive Sensors, Distributed, Ambient, and Pervasive Interactions, Jun. 2014; 8530: 207-216.
Office Action for European Patent Application No. 21 702 998.2, mailed Jan. 2, 2025, and its English translation, 18 pages.

* cited by examiner

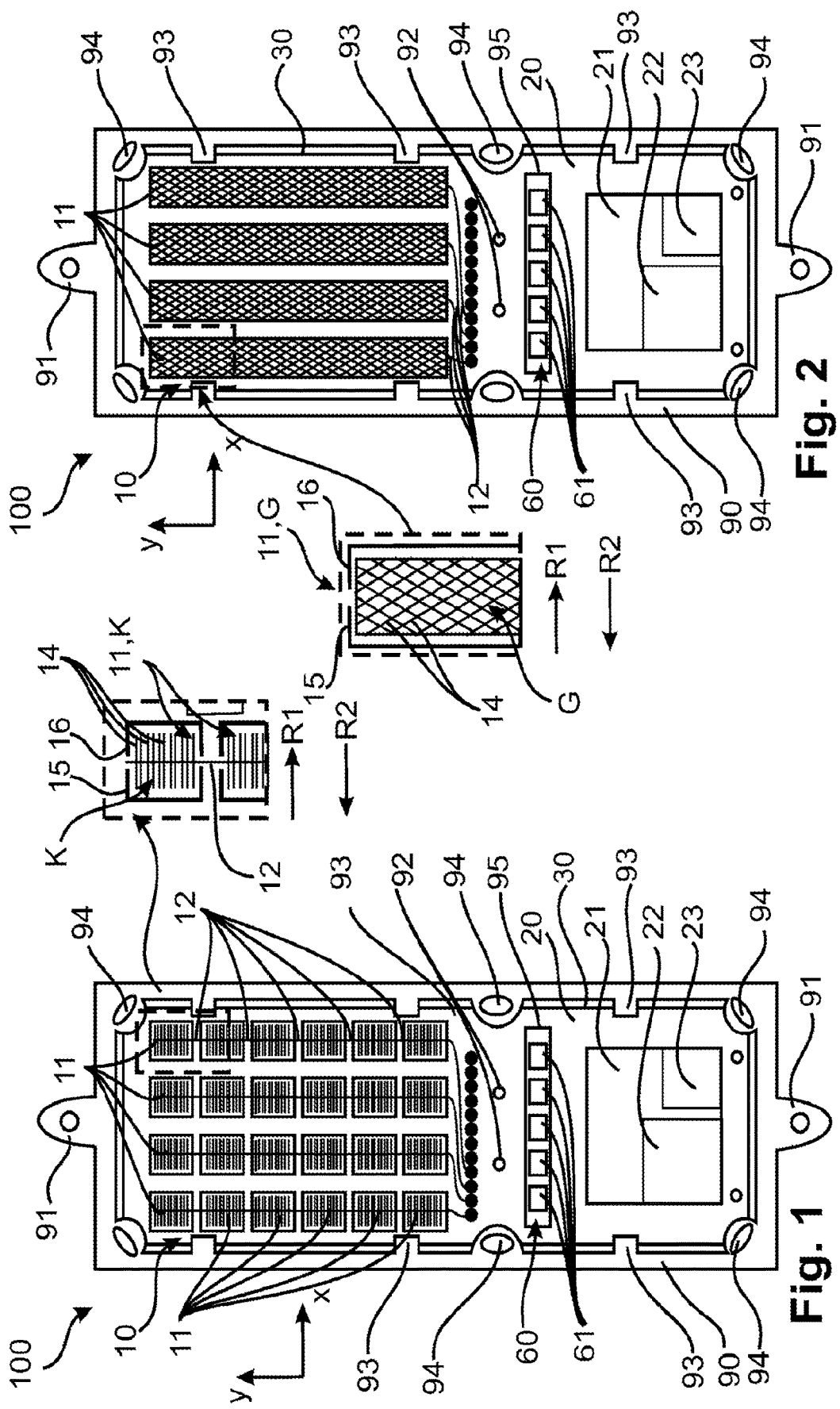

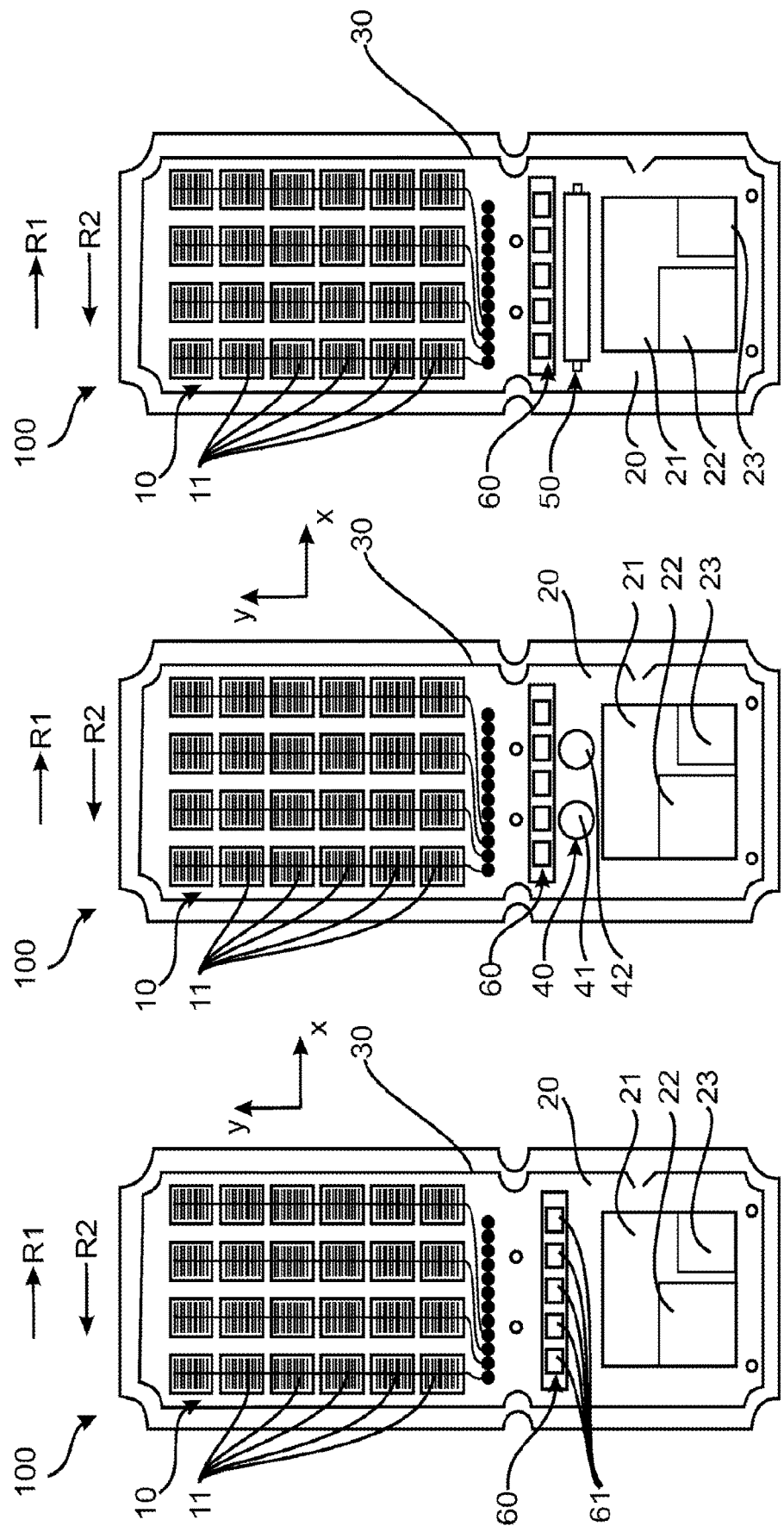

SENSOR DEVICE

The invention relates to a sensor device for actuating a movable part, in particular a sliding door, of a vehicle according to the generic term of the independent device claim. Furthermore, the invention relates to a movable part, in particular in the form of a sliding door, for a vehicle with a corresponding sensor device according to the generic term of the adjacent independent device claim. In addition, the invention relates to a structural component with a corresponding sensor device for a vehicle and to a corresponding vehicle.

It is known from the prior art that sensor devices are used to actuate moving parts of vehicles, such as doors or flaps. To detect a user's intention to open, the known sensor devices have, for example, capacitive sensor units. In known sensor devices, an LF or HF antenna is mostly provided for unlocking the movable part. The capacitive sensor units and the LF or HF antenna may be arranged on a printed circuit board. In known sensor devices, capacitive sensing is mostly associated with interference effects caused by the environment and/or by the LF or HF antenna coils.

The invention is based on the object of providing an improved sensor device for actuating a movable part, in particular a sliding door, of a vehicle. In particular, it is the object of the invention to provide a sensor device that enables reliable and safe detection of a user's intention to open and/or close the movable part. Furthermore, it is the task of the invention to provide a sensor device that has an extended functionality. Further, it is the object of the invention to provide a sensor device that has a simple structure, that can be easily mounted on the vehicle, and that can be intuitively operated. Furthermore, it is the object of the invention to provide a movable part, in particular in the form of a sliding door, for a vehicle with a corresponding sensor device. Furthermore, it is the object of the invention to provide a structural component with a corresponding sensor device for a vehicle as well as a corresponding vehicle.

The preceding object is solved by a sensor device for actuating a movable part, in particular a sliding door, of a vehicle with the features of the independent device claim. Furthermore, the object according to the invention is solved by a movable part, in particular in the form of a sliding door, for a vehicle with a corresponding sensor device with the features of the adjacent independent device claim. In addition, the object according to the invention is solved by a structural component with a corresponding sensor device for a vehicle as well as a corresponding vehicle. Further features and details of the invention result from the respective dependent claims, the description and the drawings. Features and details described in connection with individual aspects according to the invention naturally also apply in connection with the other aspects according to the invention, and vice versa in each case, so that reference is or can always be made mutually with regard to the disclosure concerning the individual aspects of the invention.

The object is solved in particular by a sensor device for actuating (actuating includes: Locking and/or unlocking as well as opening and/or closing) of a movable part, in particular a sliding door, of a vehicle, having: a capacitive sensor unit with several sensor elements for a motion detection, in particular a gesture detection, of a user to trigger an opening and/or closing of the movable part, an NFC antenna (also called NFC sensor/Near Field Communication antenna) for communicating with a vehicle-side security system, in particular comprising a locking system, and/or a user-side mobile handheld device to trigger unlocking and/or locking, but in particular locking, of the movable part, and a printed circuit board for accommodating the capacitive sensor unit and the NFC antenna (and preferably an NFC reed). The NFC antenna may also be referred to as an NFC sensor.

The actuation of the NFC antenna for unlocking and/or locking the movable part can be performed, for example, by verifying an ID code (i.e., authentication) of the user. Furthermore, it is conceivable that a separate code may be provided for this purpose. The ID code or the separate code can be exchanged between the vehicle, in particular the on-board security system, and the user, in particular the user's mobile handheld device, at a safe distance of up to 10 cm using the NFC antenna.

The sensor device within the meaning of the invention may also be referred to as an actuating device for a movable part, in particular for a sliding door, side door or tailgate, of a vehicle. In this context, the sensor device may be arranged on a B-pillar and/or on a movable part, in particular in the form of a door or sliding door, of the vehicle.

In the context of the invention, the printed circuit board is also understood to be a multi-part printed circuit board, whereby the individual parts of the printed circuit board can be galvanically connected to one another directly (e.g. via a ribbon cable or a conductor foil) or indirectly. The size and shape of the individual parts of the printed circuit board can vary in order to simplify an arrangement in a housing for the sensor device for reasons of space. It is also conceivable that the printed circuit board is flexibly designed/configured as a (multilayer) conductor foil, which further improves its use in the housing. Instead of the multi-part printed circuit board, there can also be a single-piece printed circuit board, which significantly simplifies the manufacture and assembly of the printed circuit board with the electronic components. The assembly of this one-piece printed circuit board in the housing is also easier than with a multi-piece printed circuit board.

The idea of the invention is that the capacitive sensor unit has several sensor elements to enable an accurate (preferably contactless) detection of an opening intention and/or a closing intention of a user by certain movements or gestures of the user, and that the NFC antenna has an extended function, preferably besides unlocking the movable part, namely locking the movable part. The extended function of the NFC antenna can significantly increase the security in the operation of the sensor device. Thus, the NFC antenna can be used for unlocking and/or locking the movable part from the interior of the vehicle, which can be advantageous, for example, at intersections or in dangerous situations. Also, the NFC antenna can thus be used to unlock and/or lock the movable part also from the outside with respect to the vehicle, for example to realize an emergency stop function when moving the movable part. The emergency stop function can be implemented, for example, by locking the moving part in the middle of the movement.

Furthermore, an advantageous extended function of the NFC antenna may be that a simultaneous (or in a certain upstream or downstream time window) presence of a verified security code by the NFC antenna is required as a condition for triggering an opening process and/or shooting process by the capacitive sensor unit. In this way, the advantage can be achieved that the user must bring his cell phone within a distance of up to 10 cm from the sensor device in order to release a triggering of an opening process or closing process by the capacitive sensor unit. It can be particularly advantageous that the user can also perform the movement or gesture for triggering an opening process and/or closing process by the capacitive sensor unit through his cell phone in order to facilitate operation of the sensor device. When a movement is detected, for example in a certain direction of movement, with the user's cell phone, the sensor device can sense not only the authorized user but also the required movement of the cell phone. Thus, only authorized users can trigger an opening operation and/or a firing operation by the capacitive sensor unit. In this way, unintentional opening and/or closing of the moving part can be reliably prevented. Such an approach is particularly safe because of the small distance of up to 10 cm to the actuation of the NFC antenna. The sensor device can thus be operated conveniently, with only one gesture operation being necessary for motion detection and thus for deliberate opening and/or shooting of the movable part as well as for NFC security code interrogation.

The fact that the NFC antenna can be used to communicate with different user-side devices, preferably with the mobile phone, makes the operation of the sensor device customer-friendly, convenient and comfortable. In addition, this can completely eliminate the need for a separate ID transponder for the sensor device.

The sensor device in the sense of the invention can form part of the vehicle's security system in the form of a central locking system (or locking system) with access authorization according to the keyless go or keyless entry principle. With the aid of the sensor device according to the invention, a door handle on the movable part, for example the sliding side door, side door or tailgate, of the vehicle can be dispensed with.

In addition to the capacitive sensor unit and the NFC antenna, an LDC sensor unit and/or a further, e.g. capacitive and/or ultrasound-based, sensor unit can also be provided with the sensor device. The NFC antenna can be used for both locking and unlocking the vehicle's central locking system. In addition to the NFC antenna, a facial recognition sensor, a capacitive communication unit, a transponder, a BLE antenna (Bluetooth Low Energy Antenna) and/or a UWB antenna (Ultra-wideband Antenna) can optionally be provided for locking and/or unlocking the central locking system. The further sensor unit can optionally serve to detect the user at a certain distance from the vehicle, for example up to a few meters, whereupon an authentication of the user, for example by a transponder or by the NFC antenna, can be started automatically, for example. The authentication of the user by the NFC antenna can take place in a relatively close detection range to the vehicle, for example up to 10 cm. After successful authentication of the user by the NFC antenna, the movable part can preferably be unlocked automatically. Finally, at a limited distance from the movable part, in particular from the sensor device, for example between 5 cm and 10 cm, the capacitive sensor unit can perform a motion detection or gesture detection for an intention to open and/or an intention to close the movable part by the authenticated user, preferably by his cell phone, which the user holds in his hand and moves. It is also conceivable that the movement detection or gesture detection for an intention to open and/or an intention to close the movable part by the capacitive sensor unit can be preceded by the authentication of the user, whereby the authentication of the user by the NFC antenna can only be carried out after the user has successfully detected an intention to open and/or an intention to close.

The corresponding movement or gesture for opening and/or closing the moving part can be made visible as an indication to the user by an LED display on the sensor device. Also, the LDC sensors (inductive sensors) can be used for a locking or unlocking and/or for an emergency stop function of the movable part when the surface of the movable part is directly touched.

The capacitive sensor unit can be constructed with corresponding shield elements and/or shield frames as a 3D sensor structure in different layers of the printed circuit board/PCB. The corresponding shield elements can, for example, be arranged in a deeper layer of the PCB than the capacitive sensor elements with the respective shield frames. Furthermore, the individual sensor elements can be comb-shaped or grid-shaped in order to have fewer interference effects due to eddy currents. Advantageously, when using the sensor device according to the invention, a door handle on the moving part, for example on the sliding side door, of the vehicle can be dispensed with.

Advantageously, in a sensor device, the invention may provide that the sensor elements are arranged in the form of a matrix on the printed circuit board to perform motion detection based on a capacitive change in the environment. Thus, the capacitive sensor unit may be provided as a matrix sensor having a plurality of (point or strip) sensor elements (each of which may have its own geometry or form its own sensor structure or sensor unit) distributed within the matrix. By means of such a capacitive sensor unit, an accurate detection of an opening intention and/or a closing intention of a user can be enabled by certain movements or gestures of the user. The capacitive sensor unit can perform an improved detection of a movement or gesture of the user, for example a hand or finger of the user, by the matrix with multiple sensor elements. By arranging the sensor elements within a matrix, the motion detection or gesture detection can be performed with high resolution in a first direction of motion, for example in a vehicle longitudinal direction, and a second direction of motion, for example in a vehicle upward direction. Preferably, each individual sensor element can be evaluated separately by measurement, in particular by a common electronics unit, independently of the other sensor elements of the sensor unit.

A matrix in the sense of the invention may have a plurality of rows and a plurality of columns, with a plurality of (e.g., punctiform) sensor elements being provided in each row and in each column. Also, a matrix in the sense of the invention can have only one row or only one column, wherein in the one row or in the one column several (e.g. strip-shaped) sensor elements are provided.

The sensor elements in the sense of the invention can be point-shaped or strip-shaped. The point-shaped or strip-shaped sensor elements can in turn each have their own geometry or form their own sensor structure or sensor unit. The individual point sensor elements can, for example, be comb-shaped in order to have fewer interference effects due to eddy currents. The individual strip-shaped sensor elements can, for example, have a grid-like (or likewise comb-like) structure in order to exhibit fewer interference effects due to eddy currents.

Further, in a sensor device, the invention may provide that the sensor elements form a plurality of columns and/or a plurality of rows within the matrix. In this case, the sensor elements may form a matrix array of point sensor elements or a matrix array of strip-shaped sensor elements. In the latter case, the invention refers to a row or a column of multiple strip-shaped sensor elements within the matrix. In this way, motion detection or gesture recognition can be performed with high resolution in a first direction of motion, for example in a longitudinal direction of the vehicle, and a second direction of motion, for example in an upward direction of the vehicle.

Further, in a sensor device, the invention may provide that the sensor elements are interconnected row-wise or column-wise or individually. By connecting them line by line, a number of sensor signals can be obtained which is equal to the number of lines. A number of sensor signals equal to the number of columns can be obtained by connecting them in columns. Multiple sensor signals are used for improved evaluation in motion detection or gesture recognition. If the sensor elements are interconnected individually, the number of sensor signals that can be evaluated can thereby be increased to the number of sensor elements. The different sensor signals provide different information, e.g. distance information to a certain point of the matrix, which when viewed together enable high-resolution motion detection or gesture recognition with respect to the sensor unit in the form of a matrix.

Furthermore, in a sensor device, the invention may provide that the sensor elements are arrangeable on a front side of the printed circuit board facing the movable part. Thus, the sensor area of the capacitive sensor unit may substantially face outwardly with respect to the vehicle.

Furthermore, in a sensor device, the invention can provide that complementary shield elements for the sensor elements can be arranged on a rear side of the printed circuit board facing away from the movable part. Thus, the sensor elements can be shielded towards the inside of the vehicle and the sensor area of the capacitive sensor unit can thereby be aligned towards the outside with respect to the vehicle.

Further, in a sensor device, the invention may provide that the sensor elements, complementary shield elements, and shield frames for the sensor elements are arranged in different layers of the printed circuit board or, in other words, are formed by different layers of the printed circuit board. Here, the sensor elements, complementary shield elements and shield frames for the sensor elements can form a 3D sensor structure. Thus, a compact sensor device can be provided that has improved functionality.

Furthermore, in a sensor device, the invention can provide that the sensor elements are produced photolithographically on the printed circuit board, in particular printed (in particular not wound). In this way, the production of the sensor device can be considerably simplified and, at the same time, complicated geometries of the sensor elements can be produced.

Furthermore, in a sensor device, the invention may provide that the sensor elements each form a single sensor unit. By this is meant that the sensor elements may have their own geometry, which is subordinate to the geometry of the matrix. The individual sensor units can thereby form their own sensor structures.

It is also conceivable that the sensor elements can each have a, for example central, supply line, in particular for the individual sensor units. The supply line can be used to connect the sensor elements within the sensor device and/or to an electronic unit of the sensor device.

In addition, it is conceivable that the sensor elements can have multiple branch elements to sense a capacitive change in the environment. These branch elements may be star-shaped, rib-shaped, comb-shaped, and/or grid-shaped extending from the supply line. The branch elements advantageously serve to prevent the generation of eddy currents within the sensor elements, for example triggered by the induced magnetic field of an NFC antenna.

Furthermore, in a sensor device, the invention can provide that the sensor elements each have one or two, in particular electrically isolated, shield frames that are arranged on the same side and/or in the same layer of the printed circuit board as the sensor elements. The shield frame or frames can be used in particular to intercept the eddy currents that can be generated by the induced magnetic field of an NFC antenna. It is thereby provoked the emergence of the eddy currents in the shield frame or frames, where they can decay, because the shield frame or frames have their own electrical resistance and because the shield frame or frames can be electrically isolated from all functional components of the sensor device. Preferably, the tag frame(s) does not form a closed loop so as not to generate a magnetic field itself. Preferably, the shield frame(s) may be U-shaped. If two U-shaped shield frames are provided, two shield frames each can figuratively clasp the individual sensor elements. Furthermore, it is conceivable that the sensor elements are at least partially, in particular for the most part, preferably completely, enclosed by the respective one or two shield frame(s). With the aid of the shield frame(s), additional protection is provided against the generation of eddy currents within the sensor elements.

Furthermore, in the case of a sensor device, the invention can provide that the printed circuit board has an, in particular integrated, electronics unit (control electronics) in order to control the capacitive sensor unit, (and/or) an NFC antenna, (and/or) an LDC sensor unit, (and/or) a further (capacitive or ultrasound-based) sensor unit and/or a light unit (all functional components of the sensor device are meant here, where the electronics unit can control at least one or more of these functional components). In this way, an autonomous sensor device can be provided which only needs to be supplied with electrical energy, but which does not require computing capacities in a central control unit of the vehicle. Preferably, the results of the evaluation by the electronic unit only need to be sent to the vehicle's control unit, which can be used to control a security system comprising a locking system.

Furthermore, in a sensor device, the invention can provide that the capacitive sensor unit for motion detection, in particular for (contactless) gesture detection, is implemented at a distance of from 1 cm to 20 cm, preferably from 2 cm to 15 cm, in particular from 5 cm to 10 cm, from the sensor device. Such a relatively small distance for motion detection at the capacitive sensor unit can ensure that the movable part is only opened and/or closed if a user, in particular an authorized user, is standing directly in front of the movable part. False triggering of unintentional opening and/or closing processes of the movable part by the capacitive sensor unit can thus be avoided.

Furthermore, in a sensor device, the invention may provide that the capacitive sensor unit is designed/configured for motion detection, in particular for contactless and/or contact gesture detection. Preferably, in the context of the invention, the capacitive sensor unit can distinguish between contactless gesture recognition and contact gesture recognition, for example on the basis of signal intensity.

Furthermore, in a sensor device, the invention can provide that the capacitive sensor unit is designed/configured to detect movement in a first direction of movement and/or to detect movement in a second direction of movement. Thus, an opening and/or closing process of the movable part can be initiated by different movements or gestures, for example by a hand or finger of the user.

Furthermore, it is conceivable that the motion detection in the first direction of motion can/could be provided for opening the movable part and/or the motion detection in the second direction of motion can/could be provided for closing the movable part. Thus, an improved, multi-functional actuation of the sensor device can be enabled.

Furthermore, it is conceivable that the first direction of movement and the second direction of movement can be opposite. Thus, a convenient and intuitive opening and/or closing process of the movable part can be enabled. The first direction of movement can be oriented in the direction for opening the movable part. The second direction of movement can be aligned in the direction for closing the movable part.

Furthermore, in a sensor device, the invention may provide that the NFC antenna is arranged along an outer edge of the printed circuit board. Thus, the available space on the printed circuit board can be utilized in an advantageous manner. However, an internal NFC antenna is also conceivable in the sense of the invention.

Furthermore, it is conceivable that the capacitive sensor unit, (and/or) an electronics unit, (and/or) an LDC sensor unit, (and/or) a further sensor unit and/or a light unit are/is at least partially, in particular for the most part, preferably fully, surrounded by the NFC antenna. Thus, the NFC antenna can not only be arranged on the printed circuit board in a space-saving manner, but can also assume a further function, for example a shield function for the interior components, preferably when the NFC antenna is inactive.

Moreover, in a sensor device, the invention may provide that the NFC antenna is substantially loop-shaped and/or substantially 0-shaped. In this way, the NFC antenna may form a coil, in particular a coil winding, to enable communication by means of electromagnetic induction.

Furthermore, it is conceivable that the NFC antenna has one, in particular only one, winding. Thus, a simple and inexpensive coil in the manufacture can be made possible.

Further, in a sensor device, the invention may provide that the NFC antenna is configured at least in part to shield and/or shape a capacitive field of the capacitive sensor unit. Thus, a deliberately shaped as well as interference-free sensing field can be provided at the capacitive sensor unit.

Further, in a sensor device, the invention may provide that the capacitive sensor unit is off when the NFC antenna is in sensor operation and that the NFC antenna is off when the capacitive sensor unit is in sensor operation. Thus, it can be ensured that the capacitive sensor unit is not active at the same time as the NFC antenna is in sensor operation. This can provide a secure separation between the data transmissions by the capacitive sensor unit and the NFC antenna. A virtual and/or physical switch can be provided for switching between the capacitive sensor unit and the NFC antenna.

Furthermore, in a sensor device, the invention may provide that the NFC antenna is adapted to exchange personal and/or security-related data. Advantageously, the NFC antenna can be used for communicating with a user-side mobile handheld device, such as a cell phone, tablet computer or the like, which can increase customer convenience. Furthermore, it is advantageous that certain personal and/or safety-related data can be shared with the vehicle via the NFC antenna, such as preferred seat settings, navigation data, payment data, e.g. for refueling, telephone lists, appointment data, etc.

Furthermore, in a sensor device, the invention may provide that an LDC sensor unit is arranged on the printed circuit board. The LDC sensor unit can serve for an inductive detection of an, already lightest, contact of the movable part and/or an, already smallest, movement (of only a few micrometers or even below one micrometer) of an outer skin of the movable part. For this purpose, a metallic platelet can be arranged on the outer skin of the movable part or a part of the outer skin of the movable part can be provided with a metallic coating, whose relative movement to an LDC coil of the LDC sensor unit on the printed circuit board of the sensor device can be sensed by the LDC sensor unit.

Here it is conceivable that the LDC sensor unit can have a first LDC sensor unit for locking and/or a second LDC sensor unit for unlocking a vehicle-side locking system. Thus, an advantageous functionality for actuating the movable part can be provided at the LDC sensor unit. This functionality of the LDC sensor unit can be provided in particular in addition to the functionality of the NFC antenna according to the invention.

It is also conceivable that the LDC sensor unit is designed/configured to perform an emergency stop function when the moving part is actuated, for example next to the NFC antenna. If objects in a vehicle opening are trapped by the closing moving part or if persons or objects are endangered by the opening moving part, further movement of the moving part can be stopped immediately by a quick tap on the outer skin of the moving part in the area of the LDC sensor unit.

Furthermore, in a sensor device, the invention may provide that a facial recognition sensor, a capacitive communication unit, a transponder, a BLE antenna and/or a UWB antenna are/is arranged on the printed circuit board. These components can be provided, for example, in addition to the NFC antenna, to serve for communicating with a vehicle-side security system (also called central locking system), in particular comprising a locking system, and/or a user-side mobile handheld device, in particular for authenticating the user, preferably for automatically unlocking and/or locking the vehicle's locking system, and/or for exchanging personal and/or security-related data. This functionality can be provided in particular in addition to the functionality of the NFC antenna according to the invention.

Furthermore, in a sensor device, the invention can provide that a further, for example capacitive or ultrasound-based, sensor unit is arranged on the printed circuit board. The further sensor unit may, for example, serve to detect a user at a certain distance from the vehicle.

Advantageously, the further sensor unit for detecting an approach of the user to the sensor device can be designed/configured at a distance of up to 10 m, preferably up to 5 m, in particular up to 1 m, from the vehicle. Detection of an approach of the user to the sensor device can serve to switch on the NFC antenna and possibly further components of the sensor device. Thereupon, for example, an authentication of the user, for example by the NFC antenna, can be started automatically, which can take place when the user approaches the vehicle. After the user has been successfully authenticated, for example by the NFC antenna, the movable part can preferably be automatically unlocked. Finally, the capacitive sensor unit can perform motion detection or gesture detection for an intention to open and/or an intention to close the movable part by the authenticated user at a limited distance from the movable part, in particular from the sensor device, for example between 5 cm and 10 cm.

Furthermore, in a sensor device, the invention may provide that a light unit, preferably an LED light unit, is arranged on the printed circuit board. Advantageously, the light unit may serve to output the corresponding movement or gesture for opening and/or closing the movable part as an indication to the user and/or to visualize the movements or gestures of the user when actuating the capacitive sensor unit.

Furthermore, in a sensor device, the invention can provide that the light unit can have several, for example two, three, four, preferably five, or even more light elements, preferably in the form of LEDs. In this way, different movement patterns can be flexibly and understandably displayed by the light unit as an indication for actuating the capacitive sensor unit.

Furthermore, in a sensor device, the invention may provide that the light unit, in particular the light elements, is (are) adapted to output a status message when the movable part is actuated, in particular comprising the following status messages: locked, unlocked, open and/or closed. Thus, a feedback can be output to the user to increase a confidence in the technique when actuating the movable part by means of the sensor device.

Furthermore, in the case of a sensor device, the invention can provide that the light unit, in particular the light elements, is (are) designed/configured to emit the status message with a specific light color when the moving part is actuated. Thus, the customer comfort can be increased when actuating the movable part.

Furthermore, in a sensor device, the invention can provide that the luminaire unit, in particular the luminaire elements, are designed/configured to output an indication for actuating the capacitive sensor unit. In this context, it is conceivable that the light unit, in particular the light elements, is (are) designed/configured to output, with a specific order or sequence of the light signals, at least one direction of movement for actuating the capacitive sensor unit, preferably a first direction of movement for opening the movable part and/or a second direction of movement for closing the movable part. In this way, a convenient and intuitive actuation of the movable part can be enabled.

Furthermore, in a sensor device, the invention can provide that a program code is provided for the light unit, which is stored in a memory unit of an electronic unit, and which, when at least partially executed in a computing unit of the electronic unit, programs the light unit for use on a left-hand door or right-hand door of the vehicle, preferably with different sequences of the light signals. Thus, a flexible use of the sensor device on a left door or right door of the vehicle can be enabled. A virtual and/or physical start button can be provided to start programming or reprogramming.

In addition, in the case of a sensor device, the invention can provide that a connector unit, preferably with a seal and/or strain relief, for example in the form of a labyrinth guide, for connecting cables leading to the outside, is provided in order to connect the sensor device to a vehicle-side power supply and/or control unit in terms of energy technology and/or communication technology. In this way, a finished sensor device can be provided in the form of an easily connectable modular unit that only needs to be connected to the vehicle-side power supply and/or control unit in order to be put into operation.

In addition, the invention can provide in a sensor device that a, in particular transparent, casting compound and/or a lid are/is provided in order to seal and/or cover the sensor device in a receiving seat on the vehicle, in particular on the movable part, preferably on a window or on a part of the movable part, or on a structural component of the vehicle. With the aid of the casting compound and/or the lid, a sensor device can be provided that is reliably protected from dirt and/or the effects of weather, even from the inside with respect to the moving part.

Furthermore, in the case of a sensor device, the invention can provide that a housing case or a holding frame, in particular open on one side, is provided for the printed circuit board in order to arrange the sensor device in the form of an electronics box in a receiving seat on the vehicle, in particular on the movable part, preferably on a window or on a part of the movable part, or on a structural component of the vehicle. Thus, the sensor device can be provided as an electronics box that can be handled individually.

Furthermore, in the case of a sensor device, the invention can provide that the housing case or the holding frame has at least one, preferably two, external fastening elements, e.g. in the form of fastening lugs, in order to fasten the sensor device in the form of an electronics box in a receiving seat on the vehicle, in particular on the movable part, preferably on a disc or on a part of the movable part, or on a structural component of the vehicle, preferably in a form-fitting and/or force-fitting manner, for example detachably, for example by screwing or caulking. Thus, the sensor device can be mounted easily and quickly on the movable part.

As an alternative or in addition to the fastening lugs, fastening rails and/or grooves can be provided to enable simple and guided insertion of the sensor device in a receiving seat on the vehicle. With the aid of fastening rails and/or grooves, a preferably sealing labyrinth guide can be provided between the sensor device and the receiving seat on the vehicle.

Furthermore, in the case of a sensor device, the invention can provide that the housing case has at least one, preferably two, internal fastening elements, for example in the form of fastening cams, in order to fasten the sensor device, in particular the printed circuit board, within the housing case, preferably in a form-fitting and/or force-fitting manner, for example by screwing or caulking. Thus, a simple and quick assembly of the sensor device to an electronic box can be enabled.

In addition, in a sensor device, the invention can provide that the housing case has at least one, preferably several, peripherally arranged snap elements, for example in the form of crimping ribs, in order to fasten the sensor device, in particular the printed circuit board, within the housing case, preferably in a form-fitting and/or force-fitting manner, for example by snapping in. Thus, a loss-proof and stable hold of the printed circuit board within the housing case can be made possible.

Furthermore, in a sensor device, the invention can provide that the housing case has at least one, preferably several, peripherally arranged receptacles for casting nozzles in order to be able to cast the sensor device, in particular the printed circuit board, inside the housing case from all sides. This enables the printed circuit board to be sealed completely and on both sides with all sensor elements.

Furthermore, in a sensor device, the invention may provide that a frame for a luminous unit, preferably for the luminous elements of the luminous unit, of the sensor device is provided, which is arrangeable on a front side of the printed circuit board facing the movable part, in order to frame the luminous unit on the printed circuit board of the sensor device, and/or in order to avoid the scattering effects between the luminous elements of the luminous unit, and/or in order to shape the light field of the luminous elements of the luminous unit, and/or in order to allow potting of the sensor device without covering the luminous unit. Advantageously, the frame may comprise at least one rib element for arrangement between the luminous elements of the luminous unit. Thus, individual light elements of the light unit can be individually framed to avoid the scattering effects between the light elements of the light unit.

Furthermore, in a sensor device, the invention may provide that an aperture, preferably transparent to the light of a lighting unit, is provided for the lighting unit, preferably for the lighting elements of the lighting unit, of the sensor device, which screen may be arranged on a front side of the sensor device facing the movable part and which screen may form a window in the movable part. Thus, it can be ensured that the light from the light unit passes through to the outside with respect to the vehicle. In addition, with the aid of the aperture for a lighting unit, an attractive appearance can be provided on the movable part.

Furthermore, in a sensor device, the invention can provide that a pad, in particular foam-like, preferably with closed pores, is provided for the capacitive sensor unit in order to prevent the penetration of interfering dirt particles and/or moisture into the sensor area of the capacitive sensor unit. The pad can advantageously have a permittivity close to 1 in order not to interfere with the propagation of electromagnetic fields and to enable reliable operation of the capacitive sensor unit.

Furthermore, the invention provides a movable part, in particular in the form of a sliding door, for a vehicle, comprising: a receiving seat for a sensor device for actuating the movable part, wherein the sensor device can be designed/configured as described above. With the aid of the movable part according to the invention, the same advantages can be achieved as described above in connection with the sensor device according to the invention. These advantages are fully referred to herein.

A movable part in the sense of the invention can also be understood as a disc or a part of the movable part.

In addition, the invention provides a structural component for a vehicle, comprising: a receiving seat for a sensor device for actuating a movable part of the vehicle, wherein the sensor device may be formed as described above. With the aid of the structural component according to the invention, the same advantages can be achieved as described above in connection with the sensor device according to the invention. Full reference is made to these advantages herein.

Advantageously, a sealing frame, in particular one that circumferentially, preferably completely, surrounds an outer edge of the printed circuit board, can be provided on the sensor device or on the receiving seat (in the movable part or in the structural component) in order to seal the region between a front side of the sensor device and a bearing surface in the receiving seat.

Furthermore, the invention provides a vehicle comprising: a sensor device which may be configured as described above. With the aid of the vehicle according to the invention, the same advantages described above in connection with the sensor device according to the invention can be achieved. These advantages are fully referred to herein.

Figure 6:
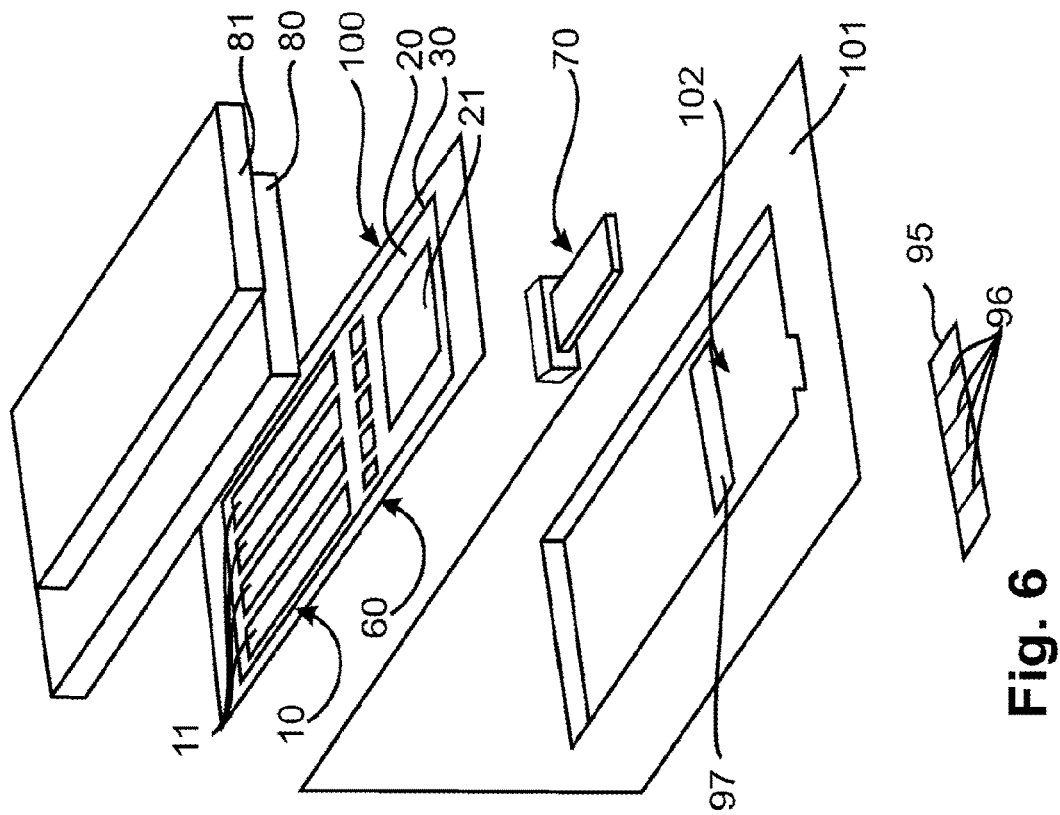
Figure 8:
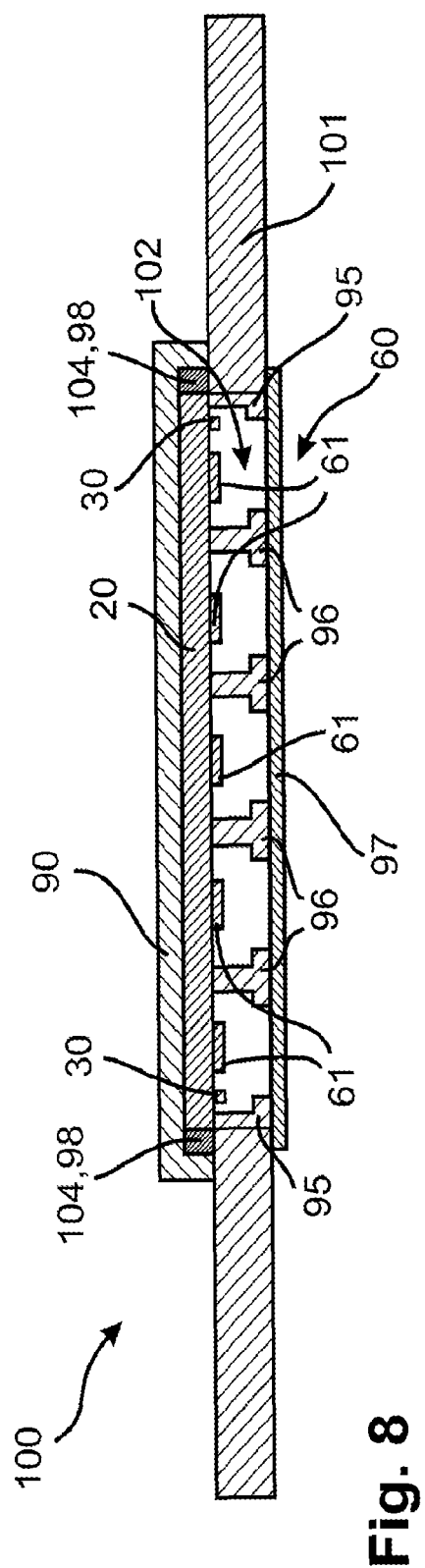
Figure 9:
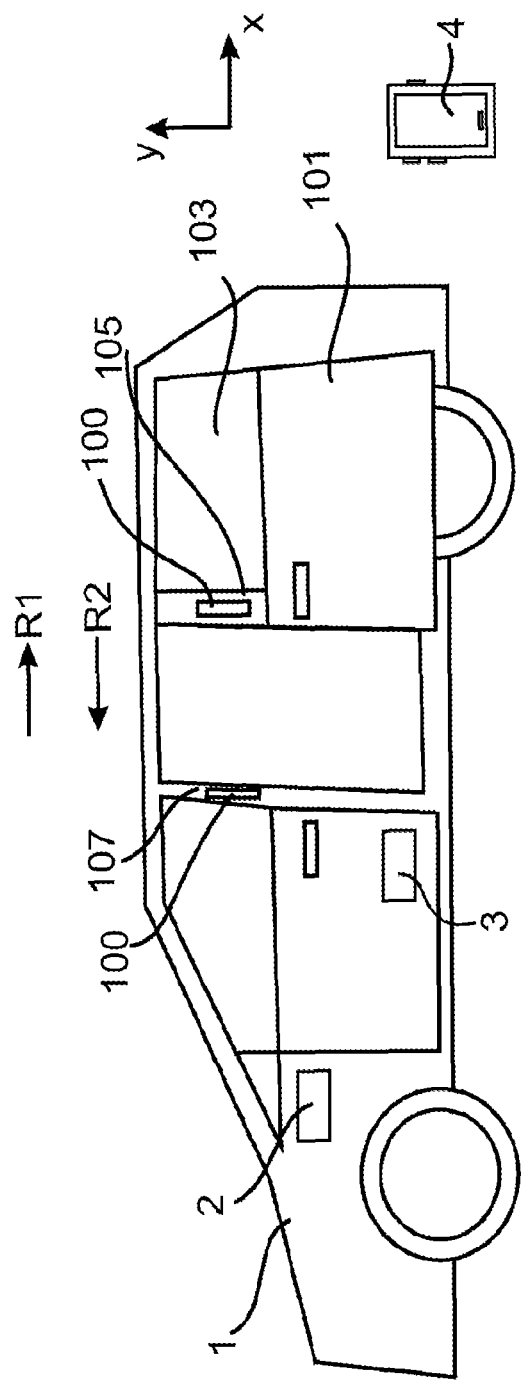

Further advantages, features and details of the invention will be apparent from the following description, in which embodiments of the invention are described in detail with reference to the drawings. In this connection, the features mentioned in the claims and in the description may each be essential to the invention individually or in any combination. It shows:

FIG. 1 a schematic representation of a sensor device with a sensor unit and an NFC antenna in the sense of the invention, FIG. 2 a schematic representation of a sensor device with a sensor unit and an NFC antenna in the sense of the invention, FIG. 3 a schematic representation of a sensor device in the sense of the invention with the NFC antenna, FIG. 4 a schematic representation of a sensor device in the sense of the invention with an LDC sensor unit, FIG. 5 a schematic representation of a sensor device in the sense of the invention with a further sensor unit, FIG. 6 a schematic representation of a sensor device according to the invention, FIG. 7 a schematic representation of a sensor device according to the invention, FIG. 8 a schematic cross-sectional view of a sensor device according to the invention in the area of a light unit, and FIG. 9 a schematic representation of a vehicle with a sensor device according to the invention.

In the following figures, the identical reference signs are used for the same technical features, even from different embodiments. Regularly, the reference signs of the same embodiments are described only once.

FIGS. 1 and 2 each show an exemplary sensor device 100 in the sense of the invention, which is designed/configured for actuating, i.e. for locking and/or unlocking as well as for opening and/or closing, a movable part 101, in particular a sliding door, of a vehicle 1 (cf. FIG. 9). The sensor device 100 in the sense of the invention has the following elements: a capacitive sensor unit 10 with several sensor elements 11 for a movement detection, in particular a gesture detection, of a user in order to trigger an opening and/or closing of the movable part 101, an NFC antenna 30 (also called NFC sensor, which can preferably have an NFC reader) for communicating with a vehicle-side security system 2, in particular comprising a locking system 3 for the movable part 101, for example in the form of a central locking system 3, for example in the form of a central locking system 3, for example in the form of a central locking system 3. in the form of a central locking system 3, and/or a user-side mobile handheld device 4, preferably a cell phone, for triggering an unlocking and/or locking of the movable part 101, and a circuit board 20 for accommodating the capacitive sensor unit 10 and the NFC antenna 30.

According to the invention, the NFC antenna 30 has an extended function, preferably in addition to unlocking the movable part 101, namely locking the movable part 101. The extended function of the NFC antenna 30 can increase safety in the operation of the sensor device 100. Thus, the NFC antenna 30 can be used for locking the movable part 101 from the interior of the vehicle 1, which can be advantageous, for example, at intersections or in dangerous situations. Of course, the NFC antenna 30 can also be used to lock the movable part 101 from the outside with respect to the vehicle 1, for example to implement an emergency stop function. The emergency stop function can be realized, for example, by locking the movable part 101 when moving between an open position and a closed position. By allowing the NFC antenna 30 to be used to communicate with various user-side devices, this makes the operation of the sensor device 100 customer-friendly and convenient. In addition, this can completely eliminate the need for a separate ID transmitter to operate the vehicle-side security system 2. Advantageously, the user can perform only one gesture operation for motion detection by the capacitive sensor unit 10 and thus for deliberately opening and/or firing the movable part 101 and for verifying his authorization by the NFC antenna 30, preferably with his cell phone. Preferably, the verification of its authorization by the NFC antenna 30 may serve a condition for opening and/or shooting the movable part 101.

As can be seen from FIGS. 1 and 2, the capacitive sensor unit 10 may be formed in the form of a matrix x, y of a plurality of sensor elements 11. In this case, the sensor elements 11 are arranged in the form of a matrix x, y on the circuit board 20. The matrix x, y is designed/configured with at least one row y (cf. strip-shaped sensor elements 11 in FIG. 2) and/or with at least one column x (not shown) or with a plurality of rows y as well as with a plurality of columns x (cf. FIG. 1), with a plurality of sensor elements 11 being provided in each row y and/or column x in each case. The sensor elements 11 in the form of a matrix x, y are used to perform motion detection based on a capacitive change in the environment.

The capacitive sensor unit 10 is thus configured as a matrix sensor having a plurality of sensor elements 11 distributed within the matrix x, y to enable accurate detection of an intention of a user to open and/or an intention of a user to close by certain movements or gestures of the user. By the matrix x, y with multiple sensor elements 11, an improved detection of a movement or gesture of the user, for example of a hand or finger of the user, can be performed. The motion detection or gesture recognition can be performed with high resolution in a first direction of movement R1, for example in a longitudinal direction of the vehicle 1 (cf. also FIG. 9), and a second direction of movement R2, for example in an upward direction of the vehicle 1 (cf. FIG. 9).

The sensor elements 11 may be photolithographically printed on the circuit board 20.

In addition to the capacitive sensor unit 10 and the NFC antenna 30 (cf. FIG. 3), an LDC sensor unit 40 (cf. FIG. 4) and/or a further, capacitive or ultrasound-based, further sensor unit 50 (cf. FIG. 5) can/could be provided in the sensor device 100, which will be discussed in detail below in connection with the description of FIGS. 4 and 5. The NFC antenna 30 can be used for both locking and unlocking the central locking system 3 of the vehicle 1. In addition to the NFC antenna 30, a facial recognition sensor, a capacitive communication unit, a transponder, a BLE antenna and/or a UWB antenna may/can optionally be provided for locking and/or unlocking the central locking system 3. The further sensor unit 50 can optionally serve to detect the user at a certain distance from the vehicle 1, for example up to a few meters, whereupon an authentication of the user by the NFC antenna 30 can be started automatically, for example. The authentication of the user by the NFC antenna 30 can be performed in a relatively close detection range to the vehicle 1, for example up to 10 cm. After the user has been successfully authenticated by the NFC antenna 30, the movable part 101 may preferably be automatically unlocked. Finally, the capacitive sensor unit 10 can perform a motion detection or gesture detection for an opening intention and/or a closing intention of the movable part 101 by the authenticated user at a limited distance from the movable part 101, in particular from the sensor device 100, for example between 5 cm and 10 cm. It is further conceivable that the motion detection or gesture detection for an intention to open and/or an intention to close the movable part 101 by the capacitive sensor unit 10 can be preceded by the authentication of the user, wherein the authentication of the user, for example by the NFC antenna 30, can only be carried out after a successful detection of an intention to open and/or an intention to close by the user.

The corresponding movement or gesture to open and/or close the movable part 101 may be made visible as an indication to the user by a lighting unit 60 on the sensor device 100, which will be discussed in more detail below. Also, the LDC sensor unit 40 of FIG. 4 can be used for a locking or unlocking and/or emergency stop function of the movable part 101 when the surface of the movable part 101 is directly touched.

The capacitive sensor unit 10 may be constructed with corresponding shield elements 11a and/or shield frames 15, 16 for the sensor elements 11 as a 3D sensor structure realized by different layers of the circuit board 20. The sensor elements 11 and the shield frames 15, 16 may be formed on a front side and/or in a layer of the circuit board 20 (facing the movable part 101), as indicated in FIGS. 1 and 2. The shield elements 11a for the sensor elements 11 may be formed on the rear side of the circuit board 20 (facing away from the movable part 101), as indicated in FIGS. 6 and 7. The shield elements 11a in FIGS. 6 and 7 are shown as strip-shaped shield elements 11a provided for the strip-shaped sensor elements 11 in FIG. 2. Complementary shield elements 11a may be provided for the sensor elements 11 of FIG. 1 or FIGS. 2 to 5, which may also be arranged in the form of a matrix x, y on the back of the circuit board 20.

The sensor device 100 in the sense of the invention can form part of the security system 2 of the vehicle 1 in the form of a central locking system 3 with access authorization according to the keyless go or keyless entry principle. With the aid of the sensor device 100 according to the invention, a door handle on the movable part 101, for example on the sliding side door, of the vehicle 1 can be dispensed with.

Furthermore, it is conceivable within the scope of the invention that the sensor elements 11 are connected row by row (not shown for simplicity) or column by column (shown in FIGS. 1 and 2) or individually (not shown for simplicity).

As indicated in the enlarged representations of FIGS. 1 and 2, that the sensor elements 11 each form individual sensor units K, G with their own geometry. It can be seen from the enlarged representations of FIGS. 1 and 2 that the individual sensor elements 11 can be comb-shaped (FIG. 1) or grid-shaped (FIG. 2) in order to exhibit fewer interference effects due to eddy currents.

Furthermore, it is shown in FIGS. 1 and 2 that the sensor elements 11 can each have a, for example central, supply line 12, in particular for the individual sensor units K, G. Furthermore, the sensor elements 11 may have a plurality of branch elements 14, which may extend from the supply line 12 in a star-shaped (not shown), rib-shaped or comb-shaped (FIG. 1) and/or grid-shaped (FIG. 2) manner.

Furthermore, FIGS. 1 and 2 show that the sensor elements 11 may have two, in particular galvanically separated, shield frames 15, 16, which are arranged on the same side and/or in the same layer of the circuit board 20 as the sensor elements 11. The shield frames 15, 16 may intercept the eddy currents that may be generated by the induced magnetic field of the NFC antenna 30.

FIGS. 1 to 7 further show schematically that the circuit board 20 may comprise an, in particular integrated, electronic unit 21, so-called control electronics, to control all functional components of the sensor device 100, which may comprise the capacitive sensor unit 10, the NFC antenna 30, an LDC sensor unit 40, a further sensor unit 50 and/or a lighting unit 60. In this way, an autonomous sensor device 100 can be provided that does not require computing capacity in a central control unit of the vehicle 1.

Preferably, the sensor device 100 can be connected to a power supply and/or control unit on the vehicle side in terms of energy technology and/or communication technology only by means of a plug-in unit 70, preferably with a seal and/or strain relief for connecting cables leading to the outside, in order to be put into operation. The plug-in unit 70 is shown schematically in FIGS. 6 and 7, In principle, it is conceivable within the scope of the invention that the capacitive sensor unit 10 for motion detection, in particular for gesture detection, is implemented at a distance of from 1 cm to 20 cm, preferably from 2 cm to 15 cm, in particular from 5 cm to 10 cm, from the sensor device 100 or the movable part 101.

Furthermore, the capacitive sensor unit 10 may be configured to detect motion in a first direction of movement R1 and/or to detect motion a second direction of movement R2, as indicated by FIGS. 1 to 5 and 9. The motion detection in the first direction of movement R1 may be for opening the movable part 101. The motion detection in the second movement direction R2 may serve to close the movable part 101. The first direction of movement R1 and the second direction of movement R2 may be oppositely oriented to enable an intuitive opening and/or closing operation of the movable part 101 using the capacitive sensor unit 10.

As shown in FIG. 3, the NFC antenna 30 may be arranged at an outer edge of the circuit board 20. Moreover, it is conceivable that the NFC antenna 30 can surround the capacitive sensor unit 10, the electronics unit 21, the LDC sensor unit 40, the further sensor unit 50 and/or the lighting unit 60, preferably completely. Consequently, the NFC antenna 30 may be arranged on the circuit board 20 in a space-saving manner and may optionally perform another function, for example a shield function for the interior components, for example when the NFC antenna 30 is inactive. The NFC antenna 30 may be substantially loop-shaped and/or substantially 0-shaped. For simplicity, the NFC antenna 30 may have only one winding.

Further, the invention may provide that the capacitive sensor unit 10 is off when the NFC antenna 30 is in sensor operation and that the NFC antenna 30 is off when the capacitive sensor unit 10 is in sensor operation to separate the data transmissions by the capacitive sensor unit 10 and the NFC antenna 30.

As shown in FIG. 4, an LDC sensor unit 40 can be provided on the circuit board 20, which can be actuated by tapping the outer skin of the movable part 101 in the area of the LDC sensor unit 40. For this purpose, a metallic platelet may be arranged on the outer skin of the movable part 101 or a part of the outer skin of the movable part 101 may be provided with a metallic coating whose relative movement to an LDC coil of the LDC sensor unit 40 on the circuit board 20 of the sensor device 100 can be sensed by the LDC sensor unit 40.

As indicated by FIG. 4, the LDC sensor unit 40 may comprise a first LDC sensor unit 41 for locking and/or a second LDC sensor unit 42 for unlocking a vehicle-side locking system 3. Furthermore, it is conceivable that the LDC sensor unit 40 may be configured to perform an emergency stop function when the movable part 101 is actuated to prevent objects from being trapped in a vehicle opening by the closing movable part 101 or to prevent people or objects from being endangered by the opening movable part 101. By a quick tap on the outer skin of the movable part 101 in the area of the first LDC sensor unit 41 or in the area of the second LDC sensor unit 42, further movement of the movable part 101, regardless of the direction, can be stopped immediately as part of the emergency stop function.

As shown in FIG. 5, a further sensor unit 50 may be arranged on the circuit board 20, which may serve, for example, to detect a user at a certain distance from the vehicle 1. The further sensor unit 50 may be designed/configured for detecting an approach of the user to the sensor device 100 at a distance of up to 10 m, preferably up to 5 m, in particular up to 1 m, from the vehicle 1. Thereupon, for example, the NFC antenna 30 and possibly other components of the sensor device 100 that require a power supply can be switched on, for example for authentication of the user. After the user has been successfully authenticated, for example by the NFC antenna 30, the movable part 101 can be automatically unlocked. The capacitive sensor unit 10 may subsequently perform motion detection or gesture detection for an intention to open and/or an intention to close the movable part 101 by the authenticated user.

As can be seen from FIG. 5, a lighting unit 60, preferably an LED light unit, may be disposed on the circuit board 20. The lighting unit 60 may be for indicating a corresponding movement or gesture for opening and/or closing the movable part 101, to output an indication to the user for opening and/or closing the movable part 101. Moreover, the lighting unit 60 may visualize the movements or gestures of the user when operating the capacitive sensor unit 10 to output a confirmation to the user that his/her movements or gestures are detected.

The lighting unit 60 may in principle comprise several, i.e. two, three, four, five, or even more lighting elements 61, preferably in the form of LEDs. FIGS. 1 to 5 show, for example, five lighting elements 61 in the frame of the lighting unit 60.

Within the scope of the invention, it is conceivable that the lighting unit 60, in particular the light elements 61, is (are) designed/configured to output a status message when the movable part 101 is actuated, which can indicate the following states of the movable part 101: locked, unlocked, open and/or closed. Different light colors can be used for different states of the movable part 101, for example red for locked, green for closed and unlocked and yellow for open.

As mentioned above, the lighting unit 60, in particular the lighting elements 61, may be designed to output an indication for actuating the capacitive sensor unit 10. In this context, it is conceivable that the lighting unit 60, in particular the lighting elements 61, is (are) designed/configured to output, with a specific order or sequence of the light signals, at least one direction of movement R1, R2 for actuating the capacitive sensor unit 10, preferably a first direction of movement R1 for opening the movable part 101 and/or a second direction of movement R2 for closing the movable part 101.

Advantageously, a program code can be provided for the lighting unit 60, which can be stored in a memory unit 22 of the electronic unit 21, and which, when at least partially executed in a computing unit 23 of the electronic unit 21, can program and/or reprogram the lighting unit 60 for use on a left-hand door or right-hand door of the vehicle 1, preferably with different sequences of the light signals.

As mentioned above and as shown in FIGS. 6 and 7, a plug-in unit 70, preferably with a seal and/or strain relief, for example in the form of a labyrinth guide, for connecting cables leading to the outside, can be provided in order to connect the sensor device 100 in terms of energy technology and/or communication technology to a power supply and/or control unit not shown on the vehicle 1.

In addition, FIGS. 6 and 7 show that a, preferably transparent, casting compound 80 and/or a lid 81 can/can be provided in order to seal and/or cover the sensor device 100 in a receiving seat 102 on the vehicle 1, in particular on the movable part 101, preferably on a disc 103 or on a part 105 of the movable part 101, or on a structural component 107 of the vehicle 1, for example B-pillar (cf. FIG. 9). The casting compound 80 is shown only schematically in block form. The casting compound 80 is poured in liquefied form around the circuit board 20, for example directly in the receiving seat 102 in the movable part 101 (cf. FIG. 6) or in a housing case 90 (cf. FIG. 7).

Furthermore, FIG. 7 and FIGS. 1 and 2 show that a housing case 90, in particular open on one side, or optionally a holding frame for the circuit board 20 can be provided in order to arrange the sensor device 100 in the form of an electronics box in the receiving seat 102 on the vehicle 1, in particular on the movable part 101, preferably on a disc 103 or on a part 105 of the movable part 101, or on a structural component 107 of the vehicle 1.

Referring back to FIGS. 1 and 2, which also show the housing case 90, it can be seen that the housing case 90 can have at least one, preferably two, external fastening elements 91, for example in the form of fastening lugs, in order to fasten the sensor device 100 in the form of an electronics box in the receiving seat 102 on the vehicle 1, for example in a form-fitting and/or force-fitting manner, for example by screwing or caulking.

Alternatively or in addition to the fastening elements 91, fastening rails and/or grooves not shown may be provided to enable simple and guided insertion of the sensor device 100 along corresponding guide elements in the receiving seat 102 on the vehicle 1. The fastening rails and/or grooves and the corresponding guide elements in the receiving seat 102 can form an automatically sealing labyrinth guide between the sensor device 100 and the receiving seat 102 on the vehicle 1.

Furthermore, FIGS. 1 and 2 show that the housing case 90 can have at least one, preferably two, internal fastening elements 92, for example in the form of fastening cams, in order to fasten the sensor device 100, in particular the circuit board 20, within the housing case 90, preferably, in a form-fitting and/or force-fitting manner, for example by screwing or caulking.

In addition, FIGS. 1 and 2 show that the housing case 90 can have at least one, preferably multiple, circumferentially arranged snap elements 93, for example in the form of crimping ribs, in order to fasten the sensor device 100, in particular the circuit board 20, within the housing case 90, preferably, in a form-fitting and/or force-fitting manner, for example by snapping in.

Furthermore, FIGS. 1 and 2 show that the housing case 90 can have at least one, preferably several, peripherally arranged mounting 94 for casting nozzles in order to be able to potting the sensor device 100, in particular the circuit board 20, within the housing case 90, fully and from all sides.

FIGS. 1 to 7 and FIG. 8 show that a frame 95 may be provided for a lighting unit 60, preferably for lighting elements 61 of the lighting unit 60, of the sensor device 100. As indicated by FIGS. 6 and 7, the frame 95 may be arranged on a front side of the circuit board 20 facing the movable part 101. The frame 95 may perform several advantageous functions: frame the lighting unit 60 on the circuit board 20 of the sensor device 100, avoid the stray effects between the lighting elements 61 of the lighting unit 60, shape the light field of the lighting elements 61 of the lighting unit 60, and enable casting of the sensor device 100 without covering the lighting unit 60 before casting. As shown in FIGS. 6, 7, and 8, the frame 95 may include at least one rib element 96 for placement between the lighting elements 61 of the lighting unit 60, but preferably one rib element 96 between each two adjacent lighting elements 61.

Furthermore, FIGS. 6, 7 and 8 show that an aperture 97, preferably transparent to the light from the lighting unit 60, may be provided for the lighting unit 60, preferably for the lighting elements 61 of the lighting unit 60, of the sensor device 100, which may be arranged on a front side of the sensor device 100 facing the movable part 101 and which may form a window in the movable part 101. The aperture 97 may be formed as a separate part, as shown in FIG. 8, or as an insert in a 2K injection molded part together with the movable part 101. If a housing case 90 is provided, as shown in FIG. 7, the housing case 90 may include a corresponding aperture 97.

Furthermore, FIG. 7 shows that a pad 98, in particular foam-like, preferably with closed pores, can be provided for the capacitive sensor unit 10 in order to prevent the penetration of disruptive dirt particles and/or moisture into the sensor area of the capacitive sensor unit 10. Advantageously, the pad 98 may have a permittivity close to 1. The pad 98 may be disposed between a front surface of the housing case 90 facing the movable part 101 and a support surface of the receiving seat 102. In principle, such a pad 98 may also be provided in FIG. 6. However, there the casting compound 80 is poured directly between the circuit board 20 and the support surface of the receiving seat 102, so that a pad 98 can be dispensed with there.

FIG. 9 shows a further aspect of the invention, namely a movable part 101, in particular in the form of a sliding door, for a vehicle 1, comprising: a receiving seat 102 for a sensor device 100 for actuating the movable part 101, wherein the sensor device 100 may be designed/configured as described above. In this context, a movable part 101 can also be understood as a disc 103 or a part 105 of the movable part 101.

In addition, FIG. 9 shows another aspect of the invention, namely a structural component 107, for example in the form of a B-pillar, for a vehicle 1, comprising: a receiving seat 102 for a sensor device 100 for actuating a movable part 101 of the vehicle 1, wherein the sensor device 100 may be configured as described above.

As further shown in FIG. 8, a sealing frame 104, in particular circumferentially, preferably fully circumferentially, surrounding an outer edge of the circuit board 20, may be provided on the sensor device 100 or on the receiving seat 102 (whether on the movable part 101 or on the structural component 107) in order to seal the region between a front side of the sensor device 100 and the bearing surface in the receiving seat 102.

In the view of FIG. 8, a pad 98 may be provided in place of the sealing frame 104 and may include a corresponding opening for the lighting unit 60.

A vehicle 1 having a corresponding sensor device 100 also represents an aspect within the scope of the invention.

The foregoing explanation of the embodiments describes the present invention exclusively in the context of examples. Of course, individual features of the embodiments may be freely combined with one another, provided that this is technically expedient, without departing from the scope of the present invention.

LIST OF REFERENCE SIGNS

1 Vehicle
2 Security system
3 Locking system
4 Handheld device
10 Capacitive sensor unit
11 Sensor element
11a Shield element
12 Supply line
14 Branch element
15 Shield frame
16 Shield frame
20 Circuit board
21 Electronic unit
22 Memory unit
23 Computing unit 30 NFC antenna
40 LDC sensor unit
41 First LDC sensor unit
42 Second LDC sensor unit
50 Further sensor unit
60 Lighting unit
61 Lighting element
70 Plug-in unit
80 casting compound
81 Lid
90 Housing case
91 Fastening element
92 Fastening element
93 Snap element
94 Mounting for a casting nozzle
95 Frame
96 Rib element
97 Aperture
98 Pad
100 Sensor device
101 Movable part
102 Receiving seat
103 Disc
104 Sealing frame
105 Part of the moving part
107 Structural components of the vehicle
K Single sensor unit
G Single sensor unit
R1 First direction of movement
R2 Second direction of movement
X Gap
Y Series
x, y Matrix

The invention claimed is:

1. A sensor device for actuating a movable part of a vehicle, comprising:
   a capacitive sensor unit having a plurality of sensor elements for movement detection of a user to at least trigger opening or closing of the movable part,
   an NFC antenna for communicating with at least a vehicle-side security system or a user-side mobile handheld device to trigger at least unlocking or locking of the movable part,
   and a circuit board for receiving the capacitive sensor unit and the NFC antenna,
   wherein at least the sensor elements are arranged in the form of a matrix with more than three columns or more than three rows of independent contactless sensor elements,
   wherein each of the sensor elements comprise a plurality of branch elements for contactlessly sensing a capacitive change of the vehicle's environment, and
   wherein each of the sensor elements comprise two galvanically isolated shield frames.

2. The sensor device according to claim 1, wherein at least the sensor elements carry out the movement detection on the basis of a capacitive change in the vehicle's environment, or that the sensor elements are connected in the rows, the columns, or individually.

3. The sensor device according to claim 1, wherein at least the sensor elements, complementary shield elements and the shield frames for the sensor elements are at least arranged in different layers of the circuit board or form a 3D sensor structure, or the sensor elements are produced photolithographically on the circuit board.

4. The sensor device according to claim 1, wherein at least the sensor elements each form a single sensor unit, or the sensor elements each have a supply line.

5. The sensor device according to claim 1, wherein the shield frames are arranged at least on a same side or in a same layer of the circuit board as the sensor elements.

6. The sensor device according to claim 1, wherein the circuit board has an electronics unit for driving at least the capacitive sensor unit, the NFC antenna, an LDC sensor unit, a further sensor unit or a lighting unit.

7. The sensor device according to claim 1, wherein the capacitive sensor unit is configured at least for contactless or contact-based movement detection.

8. The sensor device according to claim 1, wherein the capacitive sensor unit is configured at least to detect movement in a first direction of movement or to detect movement in a second direction of movement.

9. The sensor device according to claim 8, wherein the movement detection in the first direction of movement is provided for opening the movable part and the movement detection in the second direction of movement is provided for closing the movable part.

10. The sensor device according to claim 8, wherein the first direction of movement and the second direction of movement are opposite.

11. The sensor device according to claim 1, wherein the NFC antenna is arranged at least along an outer edge of the circuit board,
    or wherein at least the capacitive sensor unit, an electronics unit, an LDC sensor unit, a further sensor unit or a lighting unit are/is at least partially surrounded by the NFC antenna.

12. The sensor device according to claim 1, wherein at least the NFC antenna is substantially loop-shaped or substantially O-shaped, such that the NFC antenna forms a coil,
    or that the NFC antenna has one winding.

13. The sensor device according to claim 1, wherein at least the NFC antenna is configured at least in part at least to shield or to shape a capacitive field of the capacitive sensor unit,
    or the capacitive sensor unit is off when the NFC antenna is in sensor operation, and that the NFC antenna is off when the capacitive sensor unit is in sensor operation.

14. The sensor device according to claim 1, wherein the NFC antenna is configured at least for authenticating the user or for exchanging at least personal or security-related data.

15. The sensor device according to claim 1, wherein an LDC sensor unit is arranged on the circuit board.

16. The sensor device according to claim 1, wherein at least a face recognition sensor, a capacitive communication unit, a transponder, a BLE antenna or a UWB antenna are/is arranged on the circuit board.

17. The sensor device according to claim 1, wherein a further sensor unit is arranged on the circuit board.

18. The sensor device according to claim 1, wherein a lighting unit, is arranged on the circuit board.

19. The sensor device according to claim 18, wherein the lighting unit is configured to output a status message when the movable part is actuated.

20. The sensor device according to claim 18, wherein at least the lighting unit is configured to output an indication for actuating the capacitive sensor unit, or the lighting unit, is configured to output, with a specific order or sequence of light signals, at least one direction of movement for actuating the capacitive sensor unit,
    or a program code is provided for the lighting unit, which is stored in a memory unit of an electronic unit and which, when executed in a computing unit of the electronic unit, programs the lighting unit for use on a left-hand door or right-hand door of the vehicle.

21. The sensor device according to claim 1, wherein
a housing case or a holding frame for the circuit board is provided in order to arrange the sensor device in the form of an electronics box in a receiving seat on the vehicle.

22. The sensor device according to claim 1, wherein a frame for a lighting unit of the sensor device is provided, which is arrangeable on a front side of the circuit board facing the movable part, in order at least to frame the lighting unit on the circuit board of the sensor device, to avoid the scattering effects between lighting elements of the lighting unit, to shape the light field of the lighting elements of the lighting unit, or to allow potting of the sensor device without covering the lighting unit.

23. The sensor device according to claim 22, wherein
an aperture is provided for the lighting unit of the sensor device.

24. The sensor device according to claim 23, wherein
the aperture is arranged on a front side of the sensor device facing the movable part.

25. The sensor device according to claim 1, wherein
in that a pad is provided for the capacitive sensor unit in order to prevent at least disruptive dirt particles or moisture from penetrating into a sensor area of the capacitive sensor unit.

26. A movable part for a vehicle, comprising:
a receiving seat for a sensor device for actuating the movable part, wherein
the sensor device is formed according to claim 1.

* * * * *